(12) United States Patent
Yang et al.

(10) Patent No.: US 12,085,804 B2
(45) Date of Patent: Sep. 10, 2024

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Yong Yang, Hubei (CN); Fancheng Liu, Hubei (CN); Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/311,420

(22) PCT Filed: May 19, 2021

(86) PCT No.: PCT/CN2021/094536
§ 371 (c)(1),
(2) Date: Nov. 3, 2022

(87) PCT Pub. No.: WO2022/227138
PCT Pub. Date: Nov. 3, 2022

(65) Prior Publication Data
US 2024/0012285 A1    Jan. 11, 2024

(30) Foreign Application Priority Data
Apr. 28, 2021   (CN) .......................... 202110465375.5

(51) Int. Cl.
*G02F 1/00*       (2006.01)
*G02F 1/1335*     (2006.01)
*G02F 1/13357*    (2006.01)

(52) U.S. Cl.
CPC .. *G02F 1/133605* (2013.01); *G02F 1/133606* (2013.01); *G02F 1/133612* (2021.01)

(58) Field of Classification Search
None
See application file for complete search history.

(56) References Cited

U.S. PATENT DOCUMENTS

| 11,289,685 B2* | 3/2022 | Du .......................... H10K 59/87 |
| 2011/0205448 A1 | 8/2011 | Takata |

(Continued)

FOREIGN PATENT DOCUMENTS

| CN | 1504775 A | 6/2004 |
| CN | 104298001 A | 1/2015 |

(Continued)

OTHER PUBLICATIONS

International Search Report in International application No. PCT/CN2021/094536, mailed on Dec. 2, 2021.

(Continued)

*Primary Examiner* — Gerald J Sufleta, II
(74) *Attorney, Agent, or Firm* — PV IP PC; Wei Te Chung

(57) ABSTRACT

A backlight module and a display device are provided. The backlight module includes a light-emitting substrate and a reflective film layer disposed on a light-exiting surface of the light-emitting substrate. The light-emitting substrate includes a base substrate and light-emitting elements and light-scattering members disposed on one same surface of the base substrate. The reflective film layer includes a plurality of light-exiting holes for light passing through. A part of the light emitted by the light-emitting elements is reflected to the light-scattering members by the reflective film layer and is scattered by the light-scattering members.

(Continued)

Therefore, light intensity of regions between the light-emitting elements is enhanced.

18 Claims, 8 Drawing Sheets

(56) References Cited

U.S. PATENT DOCUMENTS

| | | | | |
|---|---|---|---|---|
| 2019/0265549 A1* | 8/2019 | Chen | ................. | G02F 1/133605 |
| 2019/0348624 A1* | 11/2019 | Kim | ..................... | H10K 50/854 |
| 2021/0389628 A1* | 12/2021 | Nishida | ............. | G02F 1/133606 |

FOREIGN PATENT DOCUMENTS

| | | |
|---|---|---|
| CN | 107656398 A | 2/2018 |
| CN | 108983499 A | 12/2018 |
| CN | 109085719 A | 12/2018 |
| CN | 110459556 A | 11/2019 |
| CN | 110703501 A | 1/2020 |
| CN | 111028714 A | 4/2020 |
| CN | 111308778 A | 6/2020 |
| CN | 111856812 A | 10/2020 |
| JP | 6314297 B1 | 4/2018 |

OTHER PUBLICATIONS

Written Opinion of the International Search Authority in International application No. PCT/CN2021/094536, mailed on Dec. 2, 2021.
Chinese Office Action issued in corresponding Chinese Patent Application No. 202110465375.5 dated Jun. 29, 2022, pp. 1-7.

* cited by examiner

BACKLIGHT MODULE AND DISPLAY DEVICE

CROSS REFERENCE TO RELATED APPLICATIONS

This application is a 371 U.S. National Stage of International Application No. PCT/CN2021/094536 filed May 19, 2021, which claims priority to Chinese patent Application No. CN202110465375.5, filed on Apr. 28, 2021. The entire disclosures of the above applications are incorporated herein by reference.

BACKGROUND OF INVENTION

Field of Invention

The present application relates to the field of display technology and particularly to a backlight module and a display device.

Description of Prior Art

Flexible bendable display technology is increasingly favored by display terminal manufacturers and common users. Organic light emitting diode (OLED) displays have unique structural advantages for realizing flexible displays. If flexible display needs to be realized on liquid crystal displays (LCDs), the first problem needs to be solved is flexibility of backlight modules. Wherein, a direct-lit backlight structures is an effective manner to solve the problem of flexibility of the backlight modules. In direct-lit backlight modules, light sources are formed by a plurality of light-emitting elements emitting light upwardly. As a result, one problem is that light extraction intensity at regions vertically correspond to the light-emitting elements is relatively strong, while the light extraction intensity at regions between the light-emitting elements is relatively weak. This results in uniformity of light extraction of the backlight modules to be relatively poor.

A technical problem of poor uniformity of light extraction intensity exists in current direct-lit backlight modules.

SUMMARY OF INVENTION

The present application provides a backlight module and a display device configured to remedy the technical problem of poor uniformity of light extraction intensity existing in current direct-lit backlight modules.

The present application provides a backlight module, including:
- a light-emitting substrate including a base substrate, a plurality of light-emitting elements disposed on a first side of the base substrate, and light-scattering members disposed on the first side of the base substrate,
- a reflective film layer disposed on a light-exiting surface of the light-emitting substrate, wherein a plurality of light-exiting holes are defined on the reflective film layer.

In the backlight module of the present application, the light-scattering members include a plurality of convex elements disposed on the first side of the base substrate.

In the backlight module of the present application, a shape of the convex elements includes one or more of a polyhedron, a hemisphere, a semi-cylindrical shape, or an annular shape.

In the backlight module of the present application, the light-emitting substrate further includes a driving circuit layer disposed on the first side of the base substrate, and the light-emitting elements are disposed on the driving circuit layer.

In the backlight module of the present application, the driving circuit layer includes a metal layer connected to the light-emitting elements, and the light-scattering members include the convex elements disposed on the metal layer.

In the backlight module of the present application, the driving circuit layer includes a first metal layer, an interlayer insulation layer disposed on the first metal layer, and a second metal layer disposed on the interlayer insulation layer, and the second metal layer is connected to the light-emitting elements.

In the backlight module of the present application, the light-scattering members include the convex elements disposed on the second metal layer.

In the backlight module of the present application, convex structures corresponding to the convex elements are disposed on the interlayer insulation layer.

In the backlight module of the present application, the driving circuit layer includes a first metal layer, an interlayer insulation layer disposed on the first metal layer, a second metal layer disposed on the interlayer insulation layer, a first passivation layer disposed on the second metal layer, and a third metal layer disposed on the first passivation layer, the second metal layer is connected to the third metal layer, and the third metal layer is connected to the light-emitting elements.

In the backlight module of the present application, the light-scattering members include the convex elements disposed on the third metal layer.

In the backlight module of the present application, convex structures corresponding to the convex elements are disposed on the first passivation layer.

In the backlight module of the present application, the driving circuit layer includes a first metal layer, an interlayer insulation layer disposed on the first metal layer, a second metal layer disposed on the interlayer insulation layer, a passivation layer disposed on the second metal layer, and a third metal layer disposed on the passivation layer, the second metal layer is connected to the third metal layer, the third metal layer is connected to the light-emitting elements, and the light-scattering members include the convex elements disposed on the second metal layer and the convex elements disposed on the third metal layer.

In the backlight module of the present application, the convex elements on the second metal layer correspond to the convex elements on the third metal layer one-to-one.

In the backlight module of the present application, convex structures corresponding to the convex elements on the second metal layer are disposed on the interlayer insulation layer.

In the backlight module of the present application, convex structures corresponding to the convex elements on the third metal layer are disposed on the first passivation layer.

In the backlight module of the present application, the driving circuit layer further includes a second passivation layer disposed on the third metal layer;
  the light-emitting elements are disposed on the second passivation layer;
  the backlight module further includes an encapsulation layer disposed between the light-emitting substrate and the reflective film layer; and
  the encapsulation layer covers the light-emitting elements.

The present application further provides a backlight module, including:

a base substrate;

a driving circuit layer disposed on the base substrate, the driving circuit layer includes a first metal layer, an interlayer insulation layer disposed on the first metal layer, a second metal layer disposed on the interlayer insulation layer, a first passivation layer disposed on the second metal layer, and a third metal layer disposed on the first passivation layer, the second metal layer is connected to the third metal layer, and convex elements are disposed on the third metal layer;

light-emitting elements disposed on the driving circuit layer, wherein the light-emitting elements are connected to the third metal layer, and the convex elements are distributed around the light-emitting elements; and a reflective film layer disposed in a light-exiting direction of the light-emitting elements, wherein a plurality of light-exiting holes are defined on the reflective film layer.

The present application further provides a display device including the aforesaid backlight module, a first substrate disposed on the light-exiting surface of the backlight module, a second substrate disposed opposite to the first substrate, and liquid crystals disposed between the first substrate and the second substrate, wherein the backlight module includes a light-emitting substrate, and the light-emitting substrate comprises light-emitting elements.

In the display device of the present application, the light-emitting substrate includes a metal layer connected to the light-emitting elements, and convex elements are disposed on the metal layer.

The present application provides a backlight module and a display device. The backlight module includes the light-emitting substrate and the reflective film layer disposed on the light-exiting surface of the light-emitting substrate. The light-emitting substrate includes the base substrate and the light-emitting elements and the light-scattering members disposed on one same surface of the base substrate. The reflective film layer includes a plurality of light-exiting holes for light passing through. A part of the light emitted by the light-emitting elements is reflected to the light-scattering members by the reflective film layer and is scattered by the light-scattering members. Therefore, light intensity of regions between the light-emitting elements is enhanced, so that distribution uniformity of light extraction intensity of the backlight module is improved, thereby improving luminescence performance of the backlight module.

DESCRIPTION OF DRAWINGS

To more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which those skilled in the art can derive further without making any inventive efforts.

FIG. 1 a is a light-emitting schematic diagram of the backlight module illustrated in FIG. 1.

DETAILED DESCRIPTION OF EMBODIMENTS

Figure 1:
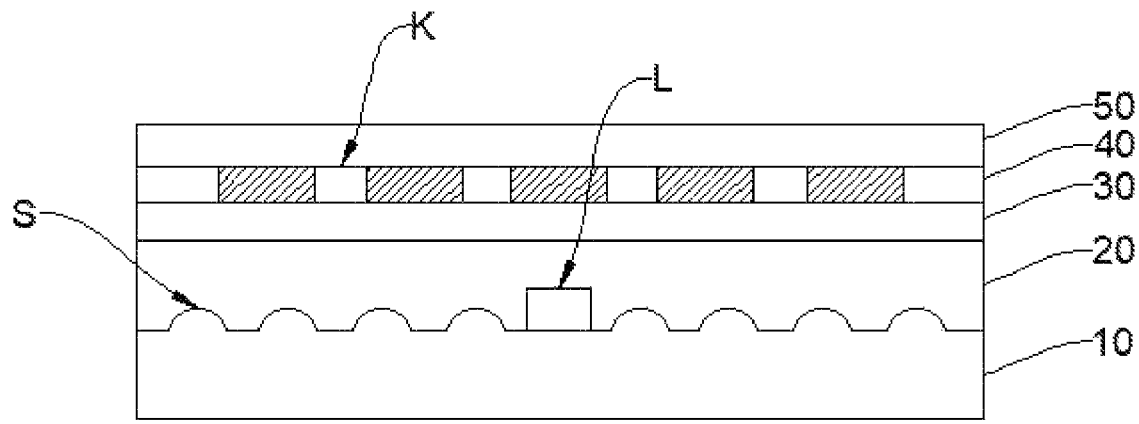
FIG. 1 is a partial structural schematic diagram of a backlight module provided by one embodiment of the present application.

The descriptions of embodiments below refer to accompanying drawings in order to illustrate certain embodiments which the present application can implement. The directional terms of which the present application mentions, for example, "top", "bottom", "upper", "lower", "front", "rear", "left", "right", "inside", "outside", "side", etc., only refer to directions of the accompanying figures. Therefore, the used directional terms are for illustrating and understanding the present application, but not for limiting the present application. In the figures, units with similar structures are indicated by the same reference numerals.

Embodiments of the present application provide a backlight module and a display device. The backlight module includes a light-emitting substrate and a reflective film layer disposed on a light-exiting surface of the light-emitting substrate. The light-emitting substrate includes a base substrate and light-emitting elements and light-scattering members disposed on one same surface of the base substrate. The reflective film layer includes a plurality of light-exiting holes for light passing through. A part of the light emitted by the light-emitting elements is reflected to the light-scattering members by the reflective film layer, and the part of the light is scattered into a plurality of directions by the light-scattering members. Therefore, light intensity of regions between the light-emitting elements is enhanced, so that distribution uniformity of light extraction intensity of the backlight module is improved, thereby improving luminescence performance of the backlight module.

Please refer to FIG. 1. FIG. 1 is a partial structural schematic diagram of the backlight module provided by one embodiment of the present application. The backlight module includes a light-emitting substrate 10 and a reflective film layer 40 disposed on the light-emitting substrate 10. Wherein, the light-emitting substrate 10 can be directly contacted to the reflective film layer 40, and other structural film layers can also be disposed between the light-emitting substrate 10 and the reflective film layer 40.

The light-emitting substrate 10 includes a base substrate, a plurality of light-emitting elements L disposed on a first side of the base substrate, and light-scattering members S disposed on the first side of the base substrate. The light-scattering members S are distributed around the light-emitting elements L. The light-emitting elements can be light emitting diode devices (LED devices) having a luminescence function. The plurality of light-emitting elements L are arranged in an array on the base substrate according to a certain arrangement rule. The light-emitting elements L are light-source devices in the backlight module. The light-scattering members S have a light-scattering surface. When a light is irradiated on the light-scattering members S, the light is scattered into a plurality of directions by the light-scattering members S to improve uniformity of light intensity distribution.

The reflective film layer 40 is disposed on the light-exiting surface of the light-emitting substrate 10. The light-exiting surface of the light-emitting substrate 10 is a surface of the light-emitting substrate 10 from where the light emitted by the light-emitting elements L. A plurality of light-exiting holes K are defined on the reflective film layer 40. The light-exiting holes K are exit channels of the light emitted by the light-emitting substrate 10. Wherein, openings of the light-exiting holes K close to the light-emitting elements L are relatively small, and their distribution number is relative less; and openings of the light-exiting holes L between adjacent light-emitting elements L are relatively large, and their distribution number is relative more.

Figure 1A:
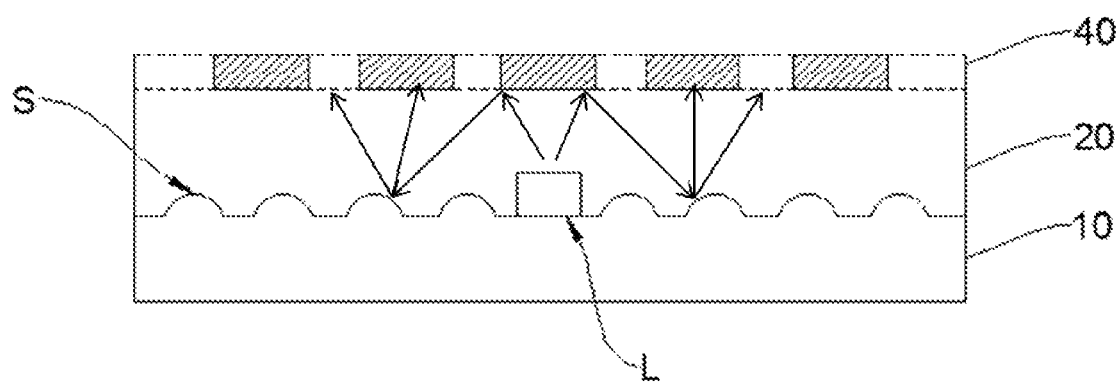

Please refer to FIG. 1 and FIG. 1a. FIG. 1a is a light-emitting schematic diagram of the backlight module illustrated in FIG. 1. Regions on the reflective film layer 40 excluding the light-exiting holes K have a relative high ability to reflect light. When the light emitted by the light-emitting elements L are irradiated on the reflective film layer 40, the light can be reflected by the reflective film layer 40. When the reflected light is irradiated on the light-emitting substrate 10 again, the light can be scattered by the light-scattering members S. Therefore, uniformity of distribution of light intensity between the light-emitting substrate 10 and the reflective film layer 40 is improved. Particularly, the distribution of the light intensity between adjacent light-emitting elements L is improved. Therefore, the uniformity of the light extraction of the backlight module can be improved by approaching the intensity of the light emitted through each light-exiting hole K on the reflective film layer 40 to be consistent.

Optionally, please refer to FIG. 1. The backlight module further includes an encapsulation layer 20 and a protective layer 30 disposed between the light-emitting substrate 10 and the reflective film layer 40. The encapsulation layer 20 is disposed on the light-exiting surface of the light-emitting substrate 10 for performing encapsulation on the light-emitting elements L and the light-scattering members S. The encapsulation layer 20 can be made of a transparent adhesive. The protective layer 30 is disposed on the encapsulation layer 20 and is connected to the encapsulation layer 20 and the reflective film layer 40. The protective layer 30 has chemical resistance, such as acid and alkali resistance and organic solvent corrosion resistance. The protective layer 30 is made of a transparent material.

Optionally, the backlight module further includes an anti-scratch layer 50 disposed on the reflective film layer 40. The anti-scratch layer 50 has good wear resistance and is configured to prevent the reflective film layer 40 from being worn by external forces. The anti-scratch layer 50 is made of a transparent material.

Furthermore, the light-scattering members S include a plurality of convex elements disposed on the first side of the base substrate to allow the light-emitting substrate 10 to have a bumpy and uneven surface.

Figure 2A:
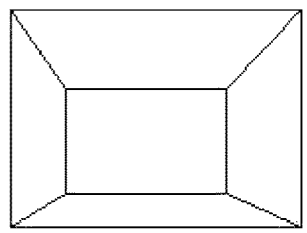
FIG. 2a is a schematic diagram of a first shape of convex elements.
Figure 2B:
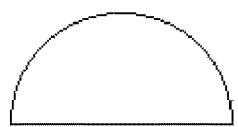
FIG. 2b is a schematic diagram of a second shape of the convex elements.
Figure 2C:
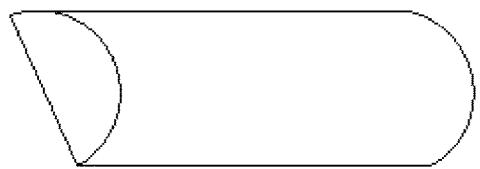
FIG. 2c is a schematic diagram of a third shape of the convex elements.
Figure 2D:
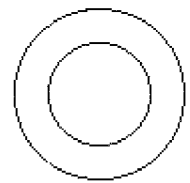
FIG. 2d is a schematic diagram of a fourth shape of the convex elements.

Optionally, a shape of the convex elements can be a polyhedron as illustrated in FIG. 2a, can also be a hemisphere as illustrated in FIG. 2b, or can be a semi-cylindrical shape as illustrated in FIG. 2c, or be an annular shape as illustrated in FIG. 2d. Wherein, the hemisphere can be a hemisphere greater than one-half of a sphere, or a hemisphere smaller than one-half of a sphere; a curved sphere of the hemisphere is a convex surface; A semicircular end surface of the semi-cylindrical shape may be a semicircle larger than one-half of a circle or can be a semicircle less than one-half of the circle. The annular shape is a three-dimensional structure having an annular structure. A size of one single convex elements ranges from 1 μm to 100 μm.

In the backlight module provided by the embodiments of the present application, by disposing the light-scattering members on the light-emitting substrate and by scattering the light reflected back to the light-emitting substrate from the reflective film layer into the plurality of directions, the light intensity of the regions between the light-emitting elements is elevated, so that distribution uniformity of light extraction intensity of the backlight module is improved, thereby improving luminescence performance of the backlight module.

Figure 3:
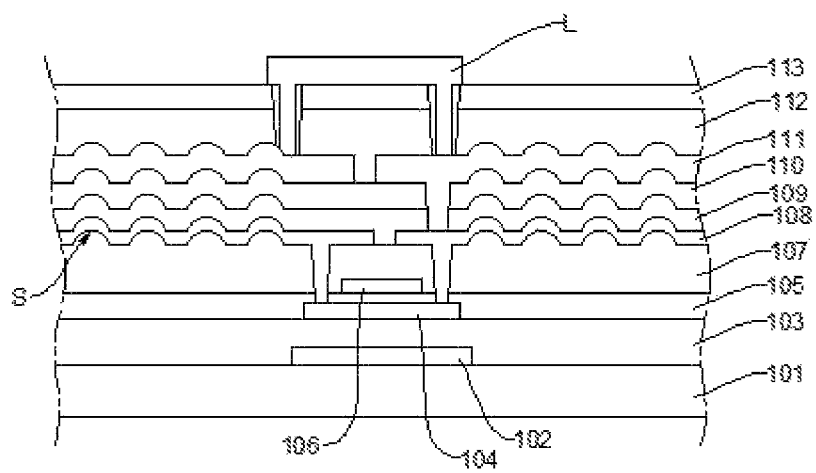
FIG. 3 is a partial structural schematic diagram of a first kind of a light-emitting substrate provided by one embodiment of the present application.

In one embodiment, please refer to FIG. 1 and FIG. 3. Wherein, FIG. 3 is a partial structural schematic diagram of a first kind of the light-emitting substrate provided by one embodiment of the present application. The light-emitting substrate 10 includes a base substrate 101, a buffer layer 103 disposed on the base substrate 101 and located on a first side of the base substrate 101, a driving circuit layer disposed on the buffer layer 103, and light-emitting elements L disposed on the driving circuit layer. Wherein the driving circuit layer includes a driving circuit; the driving circuit is configured to provide driving signals to the light emitting elements L to allow the light emitting elements L to emit light. Optionally, a shielding layer 102 is further disposed on the first side of the base substrate 101, and the shielding layer 102 has a light shielding function.

The driving circuit layer includes a semiconductor layer 104 disposed on the buffer layer 103, a gate insulation layer 105 covering the semiconductor layer 104, a first metal layer 106 disposed on the gate insulation layer 105, an interlayer insulation layer 107 covering the first metal layer 106, a second metal layer 108 disposed on the interlayer insulation layer 107, a first planarization layer 109 disposed on the second metal layer 108, a first passivation layer 110 disposed on the first planarization layer 109, a third metal layer 111 disposed on the first passivation layer 110, a second planarization layer 112 disposed on the third metal layer 111, and a second passivation layer 113 disposed on the second passivation layer 112.

Wherein, the first metal layer 106 includes a gate electrode; the second metal layer 108 includes a source electrode and a drain electrode, and the source electrode and the drain electrode are connected to the semiconductor layer 104 through via holes on the interlayer insulation layer 107 and the gate insulation layer 105; the third metal layer 111 is electrically connected to the second metal layer 108 through via holes on the first planarization layer 109 and the first passivation layer 110; and the light-emitting elements L have two opposite electrodes, and the two opposite electrodes of the light-emitting elements L are electrically connected to the third metal layer 111 through via holes on the second planarization layer 112 and the second passivation layer 113. Therefore, the light emitting function of the light-emitting elements L is controlled by the driving circuit in the driving circuit layer. Wherein, the second metal layer 111 is a patterned metal layer, and the opposite two electrodes of the light-emitting elements L are electrically connected to different metal electrodes on the second metal layer 111 respectively.

A thin film transistor device in the driving circuit is composed of the semiconductor layer 104, the gate electrode, the source electrode, and the drain electrode. The shielding layer 102 and the semiconductor layer 104 are disposed correspondingly up and down to shield light irradiated to the semiconductor layer 104.

Furthermore, a plurality of convex elements are disposed on a surface of the interlayer insulation layer 107 away from the first metal layer 106. The convex elements are distributed around orthogonal projections of the light-emitting elements L on the metal layer 106. A shape of the convex elements includes one or more of a polyhedron, a hemisphere, a semi-cylindrical shape, or an annular shape. The light-scattering members S are composed of the convex elements. The light-scattering members S allows a bumpy and uneven surface structure to be formed on the interlayer insulation layer 107.

Optionally, the light-scattering members S can be a bumpy and uneven surface structure formed on a surface of the interlayer insulation layer 107 during manufacturing the interlayer insulation layer 107.

Figure 3A:
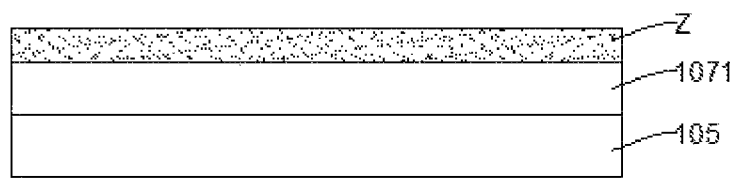
FIG. 3a is a structural schematic diagram after an original insulation layer and a photoresist layer are manufactured on a gate insulation layer.
Figure 3B:
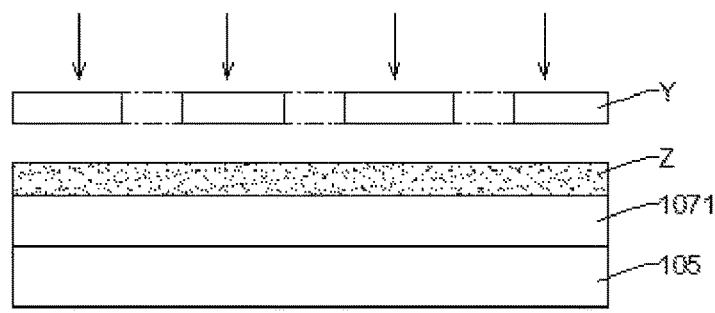
FIG. 3b is a schematic diagram of exposing the photoresist layer Z.
Figure 3C:
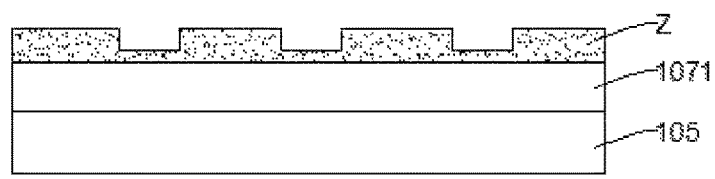
FIG. 3c is a structural schematic diagram after the photoresist layer Z is exposed.
Figure 3D:
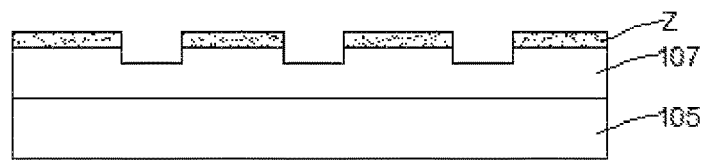
FIG. 3d is a structural schematic diagram after the photoresist layer Z and the original insulation layer are etched.
Figure 3E:
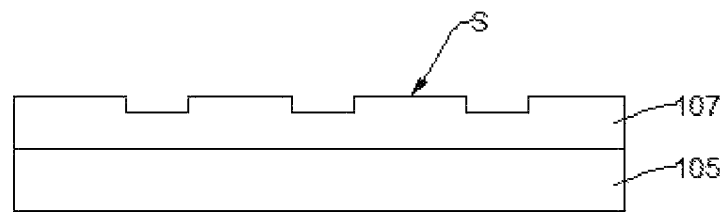
FIG. 3e is a structural schematic diagram after the photoresist layer on a surface of an interlayer insulation layer is removed.

Specifically, a method of manufacturing the light-scattering members S on the interlayer insulation layer 107 can include following steps:

manufacturing an original insulation layer 1071 on the gate insulation layer 105 and manufacturing the photoresist layer Z on the original insulation layer 1071 as illustrated in FIG. 3a;

using a halftone mask plate Y to perform a exposure process on the photoresist layer Z as illustrated in FIG. 3b, wherein the halftone mask plate Y has a semi-light transmissive region, and a thickness of the photoresist layer Z corresponding to the semi-light transmissive region is thinned by exposure;

a bumpy and uneven structure on a surface of the photoresist layer Z after the exposure process as illustrated in FIG. 3c, wherein a thickness of the photoresist layer Z at a concave hole is relatively thin, which is more easily to be etched;

etching the photoresist layer Z and the original insulation layer 1071 by a dry etching process as illustrated in FIG. 3d, so that a plurality of grooves are defined on a surface of the original insulation layer 1071, which allows the original insulation layer 1071 to form the interlayer insulation layer 107; and forming the bumpy and uneven structure on the interlayer insulation layer 107 by removing the photoresist layer Z on the surface of the interlayer insulation layer 107 by a development process as illustrated in FIG. 3e, i.e., forming the light-scattering members S in the surface of the interlayer insulation layer 107.

Wherein, regarding different shapes of the light-scattering members S, which can be manufactured by different halftone mask plates.

Furthermore, because convex structures are formed on the surface of the interlayer insulation layer 107 of the light-scattering members S, the second metal layer 108 disposed on the interlayer insulation layer 107 is elevated by the light-scattering members S, convexities are formed at positions corresponding to the light-scattering members S. Similarly, the first planarization layer 109, the first passivation layer 110, and the third metal layer 111 form convexities at locations corresponding to the light-scattering members S. Wherein, convexities on the light-scattering members S and the second metal layer 108, convexities on the first planarization layer 109, convexities on the first passivation layer 110, and convexities on the third metal layer 111 perform a scattering effect on light irradiate to surfaces thereof.

The light-emitting substrate provided by this embodiment includes the light-scattering members disposed on the interlayer insulation layer. The light-scattering members scatter the light irradiated to the surface thereof, thereby improving uniformity of distribution of light intensity of the light emitted from the light-emitting substrate.

Figure 4:
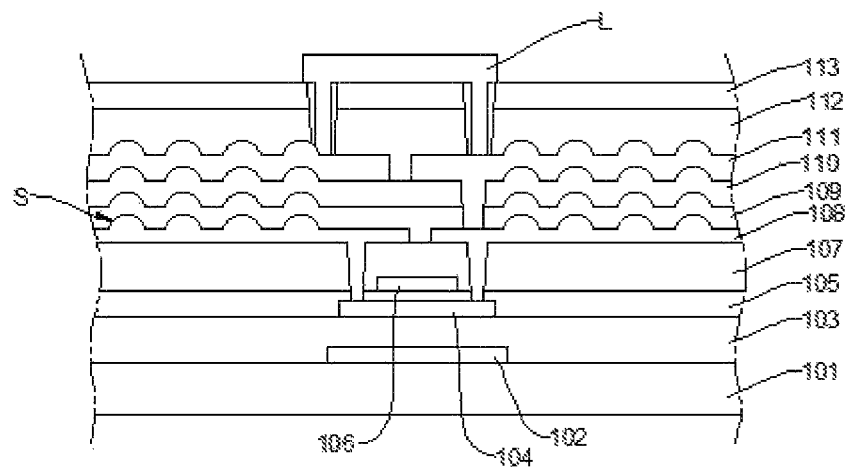
FIG. 4 is a partial structural schematic diagram of a second kind of the light-emitting substrate provided by one embodiment of the present application.

In one embodiment, please refer to FIG. 1 and FIG. 4. Wherein, FIG. 4 is a partial structural schematic diagram of a second kind of the light-emitting substrate provided by one embodiment of the present application. The light-emitting substrate illustrated in FIG. 4 has same or similar structures as the light-emitting substrate illustrated in FIG. 3. Structural characteristics of the light-emitting substrate illustrated in FIG. 4 are described as follows. Wherein, which is not described in detail, please refer to the aforesaid description of the structure of the light-emitting substrate illustrated in FIG. 3.

The light-emitting substrate 10 includes a base substrate 101, a buffer layer 103 disposed on the base substrate 101 and located on a first side of the base substrate 101, a driving circuit layer disposed on the buffer layer 103, and light-emitting elements L disposed on the driving circuit layer. Wherein the driving circuit layer includes a driving circuit; the driving circuit is configured to provide driving signals to the light emitting elements L to allow the light emitting elements L to emit light. Optionally, a shielding layer 102 is further disposed on the first side of the base substrate 101, and the shielding layer 102 has a light shielding function.

The driving circuit layer includes a semiconductor layer 104 disposed on the buffer layer 103, a gate insulation layer 105 covering the semiconductor layer 104, a first metal layer 106 disposed on the gate insulation layer 105, an interlayer insulation layer 107 covering the first metal layer 106, a second metal layer 108 disposed on the interlayer insulation layer 107, a first planarization layer 109 disposed on the second metal layer 108, a first passivation layer 110 disposed on the first planarization layer 109, a third metal layer 111 disposed on the first passivation layer 110, a second planarization layer 112 disposed on the third metal layer 111, and a second passivation layer 113 disposed on the second passivation layer 112.

Wherein, the first metal layer 106 includes a gate electrode; the second metal layer 108 includes a source electrode and a drain electrode, and the source electrode and the drain electrode are connected to the semiconductor layer 104 through via holes on the interlayer insulation layer 107 and the gate insulation layer 105; the third metal layer 111 is electrically connected to the second metal layer 108 through via holes on the first planarization layer 109 and the first passivation layer 110; and the light-emitting elements L have two opposite electrodes, and the two opposite electrodes of the light-emitting elements L are electrically connected to the third metal layer 111 through via holes on the second planarization layer 112 and the second passivation layer 113. Therefore, the light emitting function of the light-emitting elements L is controlled by the driving circuit in the driving circuit layer.

Furthermore, a plurality of convex elements are disposed on a surface of the second metal layer 108 away from the interlayer insulation layer 107, and a shape of the convex elements includes one or more of a polyhedron, a hemisphere, a semi-cylindrical shape, or an annular shape. The light-scattering members S are composed of the convex elements. The light-scattering members S allows a bumpy and uneven surface structure to be formed on the second metal layer 108.

Optionally, the light-scattering members S and the second metal layer 108 are made of a same material. Therefore, the light-scattering members S are manufactured while the second metal layer 108 is manufactured to simply processes.

Optionally, the light-scattering members S can be a bumpy and uneven surface structure formed on a surface of the second metal layer 108 during manufacturing the second metal layer 108.

Specifically, a method of manufacturing the light-scattering members S on the second metal layer 108 is same or similar to the aforesaid method of manufacturing the light-scattering members on the interlayer insulation layer. Redundant description will not be mentioned herein again.

Furthermore, because convex structures are formed on the surface of the second metal layer 108 of the light-scattering members S, the first planarization layer 109 disposed on the second metal layer 108 is elevated by the light-scattering members S, convexities are formed at positions corresponding to the light-scattering members S. Similarly, the first passivation layer 110 and the third metal layer 111 form convexities at locations corresponding to the light-scattering members S. Wherein, convexities on the light-scattering members S, convexities on the first planarization layer 109, convexities on the first passivation layer 110, and convexities on the third metal layer 111 perform a scattering effect on light irradiate to surfaces thereof.

The light-emitting substrate provided by this embodiment includes the light-scattering members disposed on the second metal layer. The light-scattering members scatter the light irradiated to the surface thereof, thereby improving uniformity of distribution of light intensity of the light emitted from the light-emitting substrate.

Figure 5:
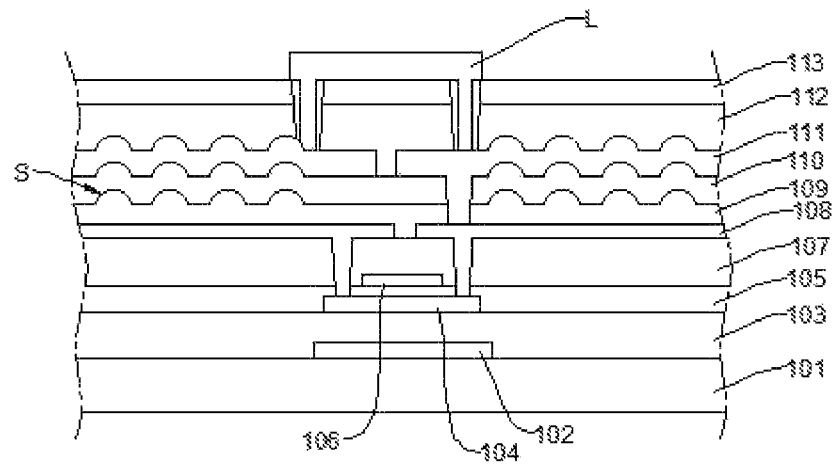
FIG. 5 is a partial structural schematic diagram of a third kind of the light-emitting substrate provided by one embodiment of the present application.

In one embodiment, please refer to FIG. 1 and FIG. 5. Wherein, FIG. 5 is a partial structural schematic diagram of a third kind of the light-emitting substrate provided by one embodiment of the present application. The light-emitting substrate illustrated in FIG. 5 has same or similar structures as the light-emitting substrate illustrated in FIG. 3. Structural characteristics of the light-emitting substrate illustrated in FIG. 5 are described as follows. Wherein, which is not described in detail, please refer to the aforesaid description of the structure of the light-emitting substrate illustrated in FIG. 3.

The light-emitting substrate 10 includes a base substrate 101, a buffer layer 103 disposed on the base substrate 101 and located on a first side of the base substrate 101, a driving circuit layer disposed on the buffer layer 103, and light-emitting elements L disposed on the driving circuit layer. Wherein the driving circuit layer includes a driving circuit; the driving circuit is configured to provide driving signals to the light emitting elements L to allow the light emitting elements L to emit light. Optionally, a shielding layer 102 is further disposed on the first side of the base substrate 101, and the shielding layer 102 has a light shielding function.

The driving circuit layer includes a semiconductor layer 104 disposed on the buffer layer 103, a gate insulation layer 105 covering the semiconductor layer 104, a first metal layer 106 disposed on the gate insulation layer 105, an interlayer insulation layer 107 covering the first metal layer 106, a second metal layer 108 disposed on the interlayer insulation layer 107, a first planarization layer 109 disposed on the second metal layer 108, a first passivation layer 110 disposed on the first planarization layer 109, a third metal layer 111 disposed on the first passivation layer 110, a second planarization layer 112 disposed on the third metal layer 111, and a second passivation layer 113 disposed on the second passivation layer 112.

Wherein, the first metal layer 106 includes a gate electrode; the second metal layer 108 includes a source electrode and a drain electrode, and the source electrode and the drain electrode are connected to the semiconductor layer 104 through via holes on the interlayer insulation layer 107 and the gate insulation layer 105; the third metal layer 111 is electrically connected to the second metal layer 108 through via holes on the first planarization layer 109 and the first passivation layer 110; and the light-emitting elements L have two opposite electrodes, and the two opposite electrodes of the light-emitting elements L are electrically connected to the third metal layer 111 through via holes on the second planarization layer 112 and the second passivation layer 113. Therefore, the light emitting function of the light-emitting elements L is controlled by the driving circuit in the driving circuit layer.

Furthermore, a plurality of convex elements are disposed on a surface of the first planarization layer 109 away from the second metal layer 108, and a shape of the convex elements includes one or more of a polyhedron, a hemisphere, a semi-cylindrical shape, or an annular shape. The light-scattering members S are composed of the convex elements. The light-scattering members S allows a bumpy and uneven surface structure to be formed on the first planarization layer 109.

Optionally, the light-scattering members S can be a bumpy and uneven surface structure formed on a surface of the first planarization layer 109 during manufacturing the first planarization layer 109.

Specifically, a method of manufacturing the light-scattering members S on the first planarization layer 109 is same or similar to the aforesaid method of manufacturing the light-scattering members on the interlayer insulation layer. Redundant description will not be mentioned herein again.

Furthermore, because convex structures are formed on the surface of the first planarization layer 109 of the light-scattering members S, the first passivation layer 110 disposed on the first planarization layer 109 is elevated by the light-scattering members S, convexities are formed at positions corresponding to the light-scattering members S. Similarly, the third metal layer 111 form convexities at locations corresponding to the light-scattering members S. Wherein, convexities on the light-scattering members S, convexities on the first passivation layer 110, and convexities on the third metal layer 111 perform a scattering effect on light irradiate to surfaces thereof.

The light-emitting substrate provided by this embodiment includes the light-scattering members disposed on the first planarization layer. The light-scattering members scatter the light irradiated to the surface thereof, thereby improving uniformity of distribution of light intensity of the light emitted from the light-emitting substrate.

Figure 6:
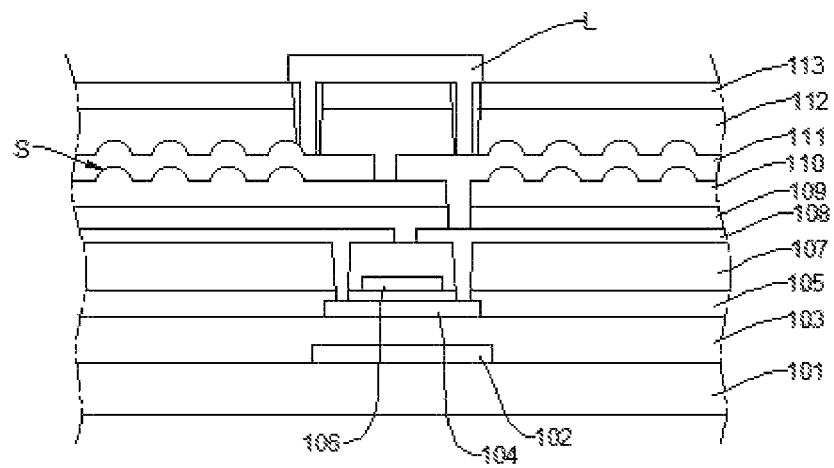
FIG. 6 is a partial structural schematic diagram of a fourth kind of the light-emitting substrate provided by one embodiment of the present application.

In one embodiment, please refer to FIG. 1 and FIG. 6. Wherein, FIG. 6 is a partial structural schematic diagram of a fourth kind of the light-emitting substrate provided by one embodiment of the present application. The light-emitting substrate illustrated in FIG. 6 has same or similar structures as the light-emitting substrate illustrated in FIG. 3. Structural characteristics of the light-emitting substrate illustrated in FIG. 6 are described as follows. Wherein, which is not described in detail, please refer to the aforesaid description of the structure of the light-emitting substrate illustrated in FIG. 3.

The light-emitting substrate 10 includes a base substrate 101, a buffer layer 103 disposed on the base substrate 101 and located on a first side of the base substrate 101, a driving circuit layer disposed on the buffer layer 103, and light-emitting elements L disposed on the driving circuit layer. Wherein the driving circuit layer includes a driving circuit; the driving circuit is configured to provide driving signals to the light emitting elements L to allow the light emitting elements L to emit light. Optionally, a shielding layer 102 is further disposed on the first side of the base substrate 101, and the shielding layer 102 has a light shielding function.

The driving circuit layer includes a semiconductor layer 104 disposed on the buffer layer 103, a gate insulation layer 105 covering the semiconductor layer 104, a first metal layer 106 disposed on the gate insulation layer 105, an interlayer insulation layer 107 covering the first metal layer 106, a second metal layer 108 disposed on the interlayer insulation layer 107, a first planarization layer 109 disposed on the second metal layer 108, a first passivation layer 110 disposed on the first planarization layer 109, a third metal layer 111 disposed on the first passivation layer 110, a second planarization layer 112 disposed on the third metal layer 111, and a second passivation layer 113 disposed on the second passivation layer 112.

Wherein, the first metal layer 106 includes a gate electrode; the second metal layer 108 includes a source electrode and a drain electrode, and the source electrode and the drain electrode are connected to the semiconductor layer 104 through via holes on the interlayer insulation layer 107 and the gate insulation layer 105; the third metal layer 111 is electrically connected to the second metal layer 108 through via holes on the first planarization layer 109 and the first passivation layer 110; and the light-emitting elements L have two opposite electrodes, and the two opposite electrodes of the light-emitting elements L are electrically connected to the third metal layer 111 through via holes on the second planarization layer 112 and the second passivation layer 113. Therefore, the light emitting function of the light-emitting elements L is controlled by the driving circuit in the driving circuit layer.

Furthermore, a plurality of convex elements are disposed on a surface of the first passivation layer 110 away from the first planarization layer 109, and a shape of the convex elements includes one or more of a polyhedron, a hemisphere, a semi-cylindrical shape, or an annular shape. The light-scattering members S are composed of the convex elements. The light-scattering members S allows a bumpy and uneven surface structure to be formed on the first passivation layer 110.

Optionally, the light-scattering members S can be a bumpy and uneven surface structure formed on a surface of the first passivation layer 110 during manufacturing the first passivation layer 110.

Specifically, a method of manufacturing the light-scattering members S on the first passivation layer 110 is same or similar to the aforesaid method of manufacturing the light-scattering members on the interlayer insulation layer. Redundant description will not be mentioned herein again.

Furthermore, because convex structures are formed on the surface of the first passivation layer 110 of the light-scattering members S, the third metal layer 111 disposed on the first passivation layer 110 is elevated by the light-scattering members S, convexities are formed at positions corresponding to the light-scattering members S. Convexities on the light-scattering members S and convexities on the third metal layer 111 perform a scattering effect on light irradiate to surfaces thereof.

The light-emitting substrate provided by this embodiment includes the light-scattering members disposed on the first passivation layer. The light-scattering members scatter the light irradiated to the surface thereof, thereby improving uniformity of distribution of light intensity of the light emitted from the light-emitting substrate.

Figure 7:
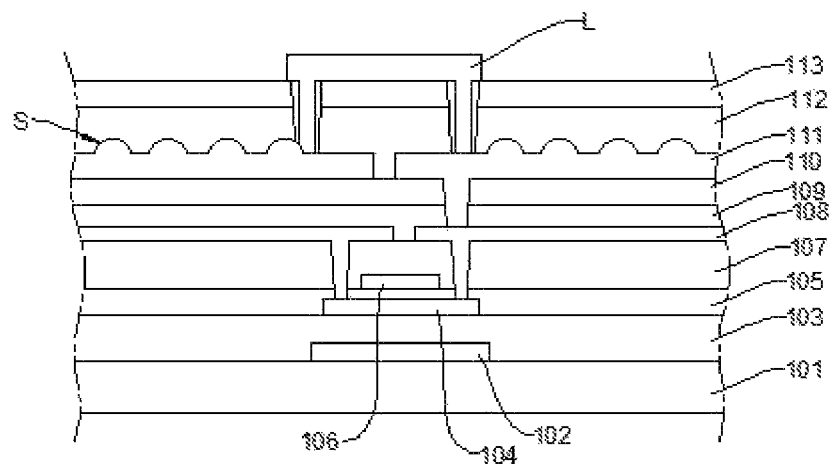
FIG. 7 is a partial structural schematic diagram of a fifth kind of the light-emitting substrate provided by one embodiment of the present application.

In one embodiment, please refer to FIG. 1 and FIG. 7. Wherein, FIG. 7 is a partial structural schematic diagram of a fifth kind of the light-emitting substrate provided by one embodiment of the present application. The light-emitting substrate illustrated in FIG. 7 has same or similar structures as the light-emitting substrate illustrated in FIG. 3. Structural characteristics of the light-emitting substrate illustrated in FIG. 7 are described as follows. Wherein, which is not described in detail, please refer to the aforesaid description of the structure of the light-emitting substrate illustrated in FIG. 3.

The light-emitting substrate 10 includes a base substrate 101, a buffer layer 103 disposed on the base substrate 101 and located on a first side of the base substrate 101, a driving circuit layer disposed on the buffer layer 103, and light-emitting elements L disposed on the driving circuit layer. Wherein the driving circuit layer includes a driving circuit; the driving circuit is configured to provide driving signals to the light emitting elements L to allow the light emitting elements L to emit light. Optionally, a shielding layer 102 is further disposed on the first side of the base substrate 101, and the shielding layer 102 has a light shielding function.

The driving circuit layer includes a semiconductor layer 104 disposed on the buffer layer 103, a gate insulation layer 105 covering the semiconductor layer 104, a first metal layer 106 disposed on the gate insulation layer 105, an interlayer insulation layer 107 covering the first metal layer 106, a second metal layer 108 disposed on the interlayer insulation layer 107, a first planarization layer 109 disposed on the second metal layer 108, a first passivation layer 110 disposed on the first planarization layer 109, a third metal layer 111 disposed on the first passivation layer 110, a second planarization layer 112 disposed on the third metal layer 111, and a second passivation layer 113 disposed on the second passivation layer 112.

Wherein, the first metal layer 106 includes a gate electrode; the second metal layer 108 includes a source electrode and a drain electrode, and the source electrode and the drain electrode are connected to the semiconductor layer 104 through via holes on the interlayer insulation layer 107 and the gate insulation layer 105; the third metal layer 111 is electrically connected to the second metal layer 108 through via holes on the first planarization layer 109 and the first passivation layer 110; and the light-emitting elements L have two opposite electrodes, and the two opposite electrodes of the light-emitting elements L are electrically connected to the third metal layer 111 through via holes on the second planarization layer 112 and the second passivation layer 113. Therefore, the light emitting function of the light-emitting elements L is controlled by the driving circuit in the driving circuit layer.

Furthermore, a plurality of convex elements are disposed on a surface of the third metal layer 111 away from the first passivation layer 110, and a shape of the convex elements includes one or more of a polyhedron, a hemisphere, a semi-cylindrical shape, or an annular shape. The light-scattering members S are composed of the convex elements. The light-scattering members S allows a bumpy and uneven surface structure to be formed on the third metal layer 111.

Optionally, the light-scattering members S and the third metal layer 111 are made of a same material. Therefore, the light-scattering members S are manufactured while the third metal layer 111 is manufactured to simplify processes.

Optionally, the light-scattering members S can be a bumpy and uneven surface structure formed on a surface of the third metal layer 111 during manufacturing the third metal layer 111.

Specifically, a method of manufacturing the light-scattering members S on the third metal layer 111 is same or similar to the aforesaid method of manufacturing the light-scattering members on the interlayer insulation layer. Redundant description will not be mentioned herein again.

The light-emitting substrate provided by this embodiment includes the light-scattering members disposed on the third metal layer. The light-scattering members scatter the light irradiated to the surface thereof, thereby improving uniformity of distribution of light intensity of the light emitted from the light-emitting substrate.

Figure 8A:
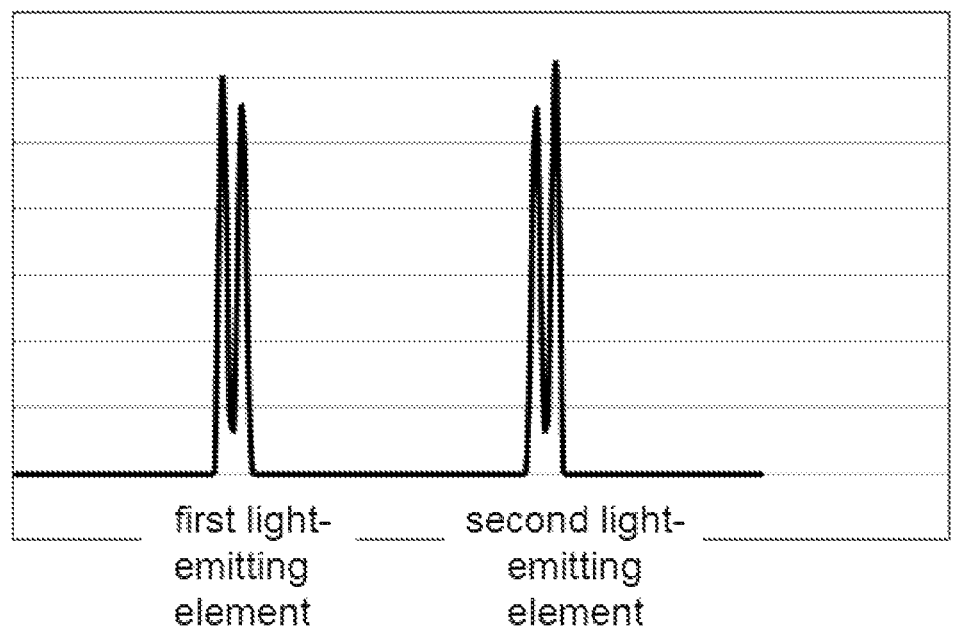
FIG. 8a is light intensity distribution curves of the backlight module including two light-emitting elements but not including light-scattering members.
Figure 8B:
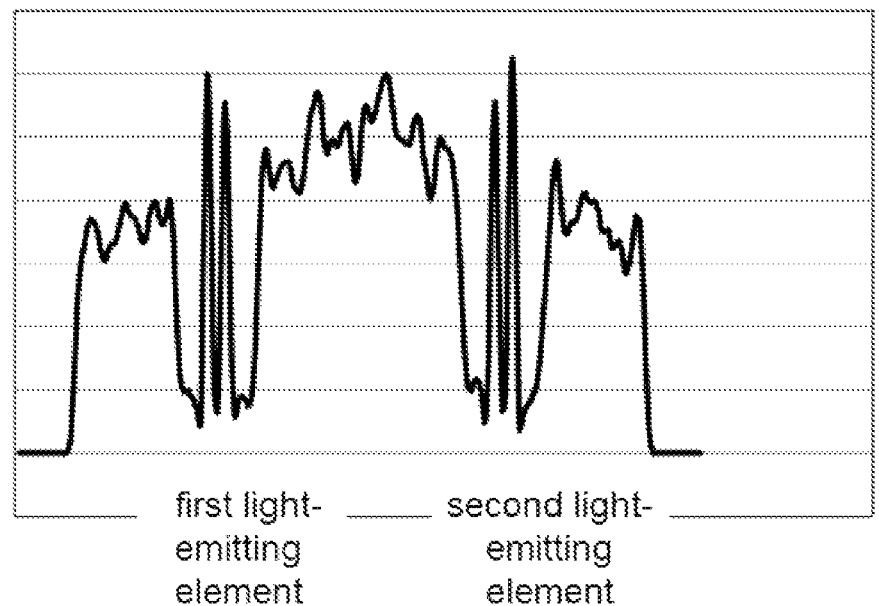
FIG. 8b is light intensity distribution curves of the backlight module including two light-emitting elements and including the light-scattering members.

Please refer to FIG. 8a and FIG. 8b. FIG. 8a is light intensity distribution curves of the backlight module including two light-emitting elements but not including the light-scattering members. FIG. 8b is light intensity distribution curves of the backlight module including two light-emitting elements and including the light-scattering members provided by the embodiments of the present application. It can be understood that after disposing the light-scattering members provided by embodiments of the present application in the backlight module, the light intensity between two light-emitting elements is significantly improved. Therefore, uniformity of light extraction of the backlight module is allowed to be significantly improved.

Figure 9:
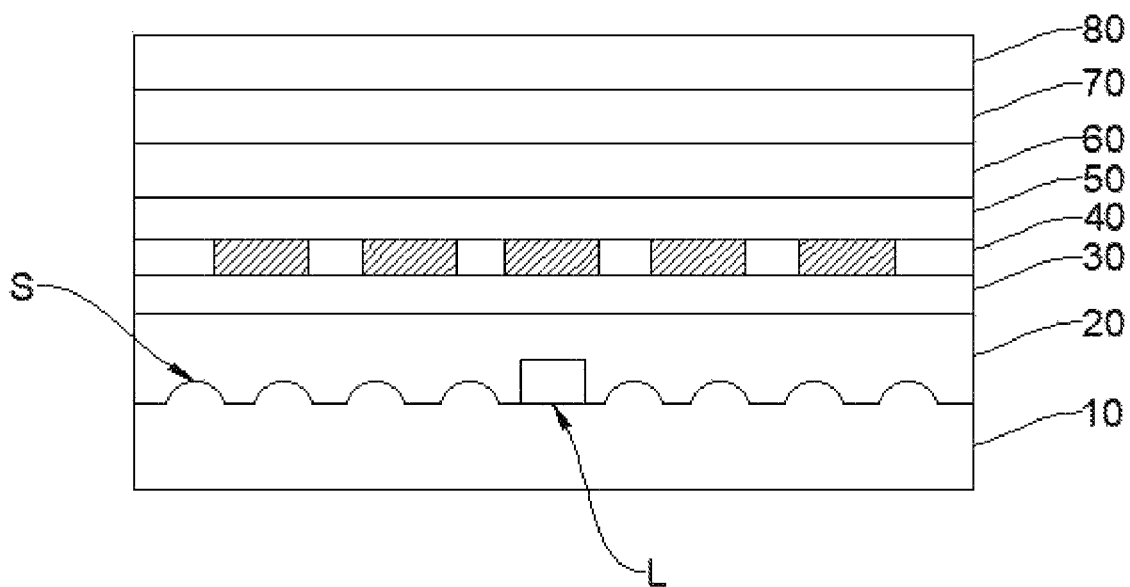
FIG. 9 is a partial structural schematic diagram of a display device provided by one embodiment of the present application.

One embodiment of the present application further provides a display device. Please refer to FIG. 9. The display device includes the backlight module provided by the aforesaid embodiments, i.e., the backlight module includes the light-emitting substrate 10, the encapsulation layer 20 disposed on the light-emitting substrate 10, the protective layer 30 disposed on the encapsulation layer 20, the reflective film layer 40 disposed on the protective layer 30, and the anti-scratch layer 50 disposed on the reflective film layer 40. The light-emitting substrate 10 includes a plurality of light-emitting element L and light-scattering members S. A plurality of light-exiting holes are defined on the reflective film layer 40. The light-exiting holes are exit channels of the light emitted by the light-emitting substrate 10.

The display device further includes a first substrate 60 disposed on the light-exiting surface of the backlight module, a second substrate 80 disposed opposite to the first substrate 60, and liquid crystals 70 disposed between the first substrate 60 and the second substrate 80.

In summary, the embodiments of the present application provide a backlight module and a display device. The backlight module includes a light-emitting substrate and a reflective film layer disposed on a light-exiting surface of the light-emitting substrate. The light-emitting substrate includes a base substrate and light-emitting elements and light-scattering members disposed on one same surface of the base substrate. The reflective film layer includes a plurality of light-exiting holes for light passing through. A part of the light emitted by the light-emitting elements is reflected to the light-scattering members by the reflective film layer and is scattered by the light-scattering members. Therefore, light intensity of regions between the light-emitting elements is enhanced, so that distribution uniformity of light extraction intensity of the backlight module is improved, thereby improving luminescence performance of the backlight module.

It should be noted that although the present application has disclosed the specific embodiments as above, the above-mentioned embodiments are not to limit to the present application. A person skilled in the art can make any change and modification; therefore, the scope of protection of the present application is subject to the scope defined by the claims.

What is claimed is:

1. A backlight module, comprising:
a light-emitting substrate comprising a base substrate, a plurality of light-emitting elements disposed on a first side of the base substrate, and light-scattering members disposed on the first side of the base substrate, wherein the light-scattering members are distributed around the light-emitting elements; and
a reflective film layer disposed on a light-exiting surface of the light-emitting substrate, wherein a plurality of light-exiting holes are defined on the reflective film layer;
wherein the light-emitting substrate further comprises a driving circuit layer disposed on the first side of the base substrate, and the light-emitting elements are disposed on the driving circuit layer; and
wherein the driving circuit layer comprises a first metal layer, an interlayer insulation layer disposed on the first metal layer, a second metal layer disposed on the interlayer insulation layer, a first passivation layer disposed on the second metal layer, and a third metal layer disposed on the first passivation layer, the second metal layer is connected to the third metal layer, and the third metal layer is connected to the light-emitting elements.

2. The backlight module as claimed in claim 1, wherein the light-scattering members comprise a plurality of convex elements disposed on the first side of the base substrate.

3. The backlight module as claimed in claim 2, wherein a shape of the convex elements comprises one or more of a polyhedron, a hemisphere, a semi-cylindrical shape, or an annular shape.

4. The backlight module as claimed in claim 1, wherein the driving circuit layer comprises a metal layer connected to the light-emitting elements, and the light-scattering members comprise the convex elements disposed on the metal layer.

5. The backlight module as claimed in claim 4, wherein the convex elements are distributed around orthogonal projections of the light-emitting elements on the metal layer.

6. The backlight module as claimed in claim 1, wherein the driving circuit layer comprises a first metal layer, an interlayer insulation layer disposed on the first metal layer, and a second metal layer disposed on the interlayer insulation layer, and the second metal layer is connected to the light-emitting elements.

7. The backlight module as claimed in claim 6, wherein the light-scattering members comprise convex elements disposed on the second metal layer.

8. The backlight module as claimed in claim 7, wherein convex structures corresponding to the convex elements are disposed on the interlayer insulation layer.

9. The backlight module as claimed in claim 1, wherein the light-scattering members comprise convex elements disposed on the third metal layer.

10. The backlight module as claimed in claim 9, wherein convex structures corresponding to the convex elements are disposed on the first passivation layer.

11. The backlight module as claimed in claim 1, wherein the driving circuit layer comprises a first metal layer, an interlayer insulation layer disposed on the first metal layer, a second metal layer disposed on the interlayer insulation layer, a first passivation layer disposed on the second metal layer, and a third metal layer disposed on the first passivation layer, the second metal layer is connected to the third metal layer, the third metal layer is connected to the light-emitting elements, and the light-scattering members comprise convex elements disposed on the second metal layer and convex elements disposed on the third metal layer.

12. The backlight module as claimed in claim 11, wherein the convex elements on the second metal layer correspond to the convex elements on the third metal layer one-to-one.

13. The backlight module as claimed in claim 11, wherein convex structures corresponding to the convex elements on the second metal layer are disposed on the interlayer insulation layer.

14. The backlight module as claimed in claim 11, wherein convex structures corresponding to the convex elements on the third metal layer are disposed on the first passivation layer.

15. The backlight module as claimed in claim 11, wherein the driving circuit layer further comprises a second passivation layer disposed on the third metal layer;
the light-emitting elements are disposed on the second passivation layer;
the backlight module further comprises an encapsulation layer disposed between the light-emitting substrate and the reflective film layer; and the encapsulation layer covers the light-emitting elements.

16. A display device, comprising: the backlight module as claimed in claim 1, a first substrate disposed on the light-exiting surface of the backlight module, a second substrate disposed opposite to the first substrate, and liquid crystals disposed between the first substrate and the second substrate,
wherein the backlight module comprises a light-emitting substrate, and the light-emitting substrate comprises light-emitting elements.

17. The display device as claimed in claim 16, wherein the light-emitting substrate comprises a metal layer connected to the light-emitting elements, and convex elements are disposed on the metal layer.

18. A backlight module comprising:
a base substrate;
a driving circuit layer disposed on the base substrate, wherein the driving circuit layer comprises a first metal layer, an interlayer insulation layer disposed on the first metal layer, a second metal layer disposed on the interlayer insulation layer, a first passivation layer disposed on the second metal layer, and a third metal layer disposed on the first passivation layer, the second metal layer is connected to the third metal layer, and convex elements are disposed on the third metal layer;
light-emitting elements disposed on the driving circuit layer, wherein the light-emitting elements are connected to the third metal layer, and the convex elements are distributed around the light-emitting elements; and
a reflective film layer disposed in a light-exiting direction of the light-emitting elements, wherein a plurality of light-exiting holes are defined on the reflective film layer.

* * * * *